(12) United States Patent
Jeannette et al.

(10) Patent No.: US 9,864,112 B1
(45) Date of Patent: Jan. 9, 2018

(54) CONFORMABLE RETROREFLECTIVE GRAPHIC FILM

(71) Applicant: 3M INNOVATIVE PROPERTIES COMPANY, St. Paul, MN (US)

(72) Inventors: Jennifer Jeannette, St. Paul, MN (US); Andrew W. Morris, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/352,623

(22) Filed: Nov. 16, 2016

(51) Int. Cl.
*G02B 5/128* (2006.01)
*B32B 7/12* (2006.01)
*B32B 7/06* (2006.01)
*G02B 1/14* (2015.01)

(52) U.S. Cl.
CPC ............... *G02B 5/128* (2013.01); *B32B 7/06* (2013.01); *B32B 7/12* (2013.01); *G02B 1/14* (2015.01); *B32B 2255/10* (2013.01); *B32B 2255/26* (2013.01); *B32B 2307/416* (2013.01)

(58) Field of Classification Search
CPC ......... B32B 7/12; B32B 7/06; B32B 2255/10; B32B 2255/26; B32B 2307/416; G02B 1/14; G02B 5/128
USPC .................................. 359/534–542, 546–548
See application file for complete search history.

(56) References Cited

U.S. PATENT DOCUMENTS

| | | |
|---|---|---|
| 3,239,478 A | 3/1966 | Harlan, Jr. |
| 3,935,338 A | 1/1976 | Robertson |
| 4,181,752 A | 1/1980 | Martens |
| 4,664,966 A | 5/1987 | Bailey |
| 4,952,650 A | 8/1990 | Young |
| 4,983,436 A * | 1/1991 | Bailey ..................... B32B 27/08 359/538 |
| 5,069,964 A | 12/1991 | Tolliver |
| 5,169,727 A | 12/1992 | Boardman |
| 5,623,010 A | 4/1997 | Groves |
| 5,650,215 A | 7/1997 | Mazurek |
| 5,882,771 A | 3/1999 | Klein |
| 5,897,930 A | 4/1999 | Calhoun |

(Continued)

FOREIGN PATENT DOCUMENTS

| | | |
|---|---|---|
| EP | 0672921 | 9/1995 |
| WO | WO 02-19038 | 3/2002 |

OTHER PUBLICATIONS

Shining a Light on Creativity: New 3M Wrap Reflective Film Improves Application with High conformability and self-Healing, Oct. 17, 2016, 3 pp.

*Primary Examiner* — James Phan
(74) *Attorney, Agent, or Firm* — Emily M. Van Vliet

(57) ABSTRACT

The present disclosure provides a retroreflective film for removable application to a three-dimensional object. The film comprises a transparent film layer; a first transparent adhesive layer; a retroreflective layer comprising glass microspheres and a binder; a metalized coating layer comprising aluminum applied on the retroreflective layer; a removable adhesive layer having a peel force of 2 lbs/inch or less. When the film is elongated by 50% it retains at least 50% of its unstretched coefficient of retroreflection as measured at the 0.2 degree observation angle and −4 degree entrance angle. When the film is elongated by 50% it retains at least 50% of its unstretched gloss when measured at a 20 degree angle.

9 Claims, 4 Drawing Sheets

(56) References Cited

U.S. PATENT DOCUMENTS

| | | |
|---|---|---|
| 6,197,397 B1 | 3/2001 | Sher |
| 6,548,164 B1 | 4/2003 | Bacon, Jr. |
| 6,677,376 B1 | 1/2004 | Hamilton |
| 2004/0241393 A1 | 12/2004 | Thakkar |
| 2010/0124632 A1 | 5/2010 | Hannington |

\* cited by examiner

CONFORMABLE RETROREFLECTIVE GRAPHIC FILM

FIELD OF INVENTION

The present invention relates to wrappable, conformable film that is retroreflective and can be removably applied to a three-dimensional object, such as a vehicle.

BACKGROUND

Graphic films are used in a variety of applications, such as installation on an interior or exterior surface of a building, vehicle or other structure. A variety of types and finishes for graphic films exist, including colored, matte, glossy, textured and in some instances reflective and even retroreflective. It can be difficult to apply or install a graphic film that is retroreflective on a three dimensional or complex surface. Effective installation of such a film requires the film to be stretched, and sometimes removed, repositioned, and applied a second time. These variables in film handling often result in visual defects in the film, such as dark or dull spots.

SUMMARY

The present invention provides an improved retroreflective graphic film that more effectively maintains surface gloss and retroreflectivity values after being stretched. Additionally, the present disclosure provides a retroreflective film where retroreflectivity can be at least partially restored after the film is damaged through the application of heat. This allows retroreflective films consistent with the present disclosure to be installed on vehicles resulting in fewer dark spots created by handling during installation and restoration of retroreflectivity in damaged film areas.

In one instance, the present disclosure provides a retroreflective film for removable application to a three-dimensional object. The film comprises a transparent film layer; a first transparent adhesive layer; a retroreflective layer comprising glass microspheres and a binder; a metalized coating layer comprising aluminum applied on the retroreflective layer; and a removable adhesive layer having a peel force of 2 lbs/inch or less. When the film is elongated by 50% it retains at least 50% of its unstretched coefficient of retroreflection as measured at the 0.2 degree observation angle and −4 degree entrance angle.

In another instance, the present disclosure provides a retroreflective film for removable application to a three-dimensional object. The film comprises a transparent film layer; a first transparent adhesive layer; a retroreflective layer comprising glass microspheres and a binder; a metalized coating layer comprising aluminum applied on the retroreflective layer; and a removable adhesive layer having a peel force of 2 lbs/inch or less. When the film is elongated by 50% it retains at least 50% of its unstretched gloss when measured at a 20 degree angle and in the machine direction.

In some embodiments, the removable adhesive has a peel force of 1.5 lb/inch or less.

In some embodiments, the removable adhesive layer comprises channels that define exit pathways to provide a fluid egress to a periphery of the film when the film is applied to a three-dimensional object.

In some embodiments, the removable adhesive layer comprises posts in the adhesive to allow slidability.

In some embodiments, the film further comprises a graphic printed onto the transparent film layer.

In some embodiments, the film has a total thickness in the range of 5 to 8 mils.

In some embodiments, the removable adhesive layer is a pressure sensitive adhesive.

In some embodiments, the film further comprises a structured removable liner adjacent to the removable adhesive layer.

In some embodiments, when the film is elongated by 50% it retains at least 50% of its gloss when unstretched as measured at a 20 degree angle and in the machine direction.

In some embodiments, when the film is elongated by 50%, it retains at least 90% of its gloss when measured unstretched at a 60 degree angle in the machine direction.

In some embodiments, when the film is elongated by 50%, it retains at least 70% of its gloss when measured unstretched at a 20 degree angle in the machine direction.

BRIEF DESCRIPTION OF THE DRAWINGS

The invention may be more completely understood in consideration of the following detailed description of various embodiments of the invention in connection with the accompanying drawings, in which.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
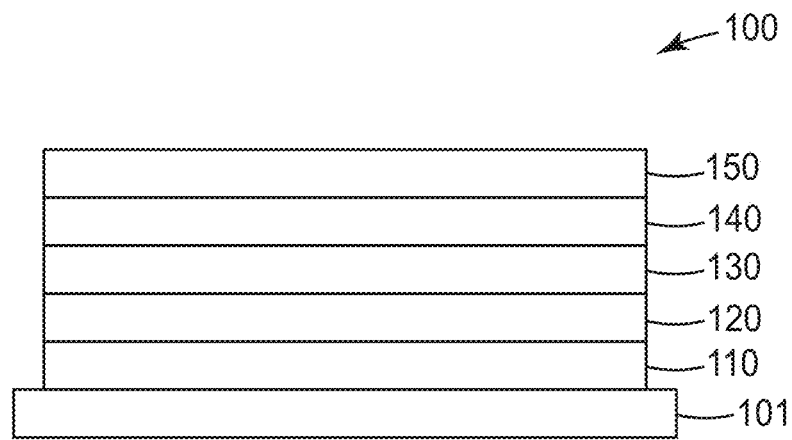
FIG. 1 is an exemplary portion of a cross section of a retroreflective film consistent with the present disclosure.

FIG. 1 is an exemplary portion of a cross section of a retroreflective film 100 consistent with the present disclosure. FIG. 1 shows the layers of a film in the order they would appear when the film is applied to a three-dimensional object 101. Object 101 may be any surface to which a removable retroreflective film may be applied. For example, object 101 may include interior or exterior surfaces of a building, a vehicle, or any other object. The surface of object 101 may be made of any type of material, including but not limited to plastic, metal, wood, brick, stone, cement or concrete.

Layer 150 is a transparent film layer. Layer 150 may be made of any suitable compliant film that is stretchable and transparent. Suitable films include, for example, vinyl, polyvinyl chloride, plasticized polyvinyl chloride, polyurethane, polyethylene, polypropylene, fluororesin or the like. The thickness of layer 150 may vary widely depending upon the desired application, but is usually in a range of 12 mils or less, and may preferably be in the range of 1 mil to three mils. Layer 150 is transparent such that it allows light to pass through it so that objects behind it can be clearly seen. Layer 150 may be compliant such that when it is stretched, the film does not recover to its original length without the application of heat.

In some instances, a graphic or image may be printed on layer 150 using any known printing methods, such as ink jet printing (solvent, latex, UV inks, etc.), solvent printing, screen printing (solvent inks, UV inks, etc.) and gravure printing. The retroreflectivity of a graphic printed on the film will depend upon the transparency of the inks used and how much ink is deposited on the film.

In some instances, an optional protective film layer (or overlaminate) may be laminated over layer 150 to protect the exterior surface of the film or a graphic or image printed on layer 150. A protective film layer may have the same composition and thickness as layer 150. Adhesive or heat may be used to laminate an optional protective layer to film 150.

Layer 140 is a transparent adhesive layer. Examples of adhesive that may be used for layer 140 include any suitable pressure sensitive adhesive. Classes of suitable pressure sensitive adhesives include acrylics, tackified rubber, tackified synthetic rubber, ethylene vinyl acetate and the like. Suitable acrylic adhesives are disclosed, for example, in U.S. Pat. Nos. 3,239,478; 3,935,338; 5,169,727; 4,952,650 and 4,181,752, incorporated herein by reference.

In some instances, a primer may be optionally coated on film layer 150 before adhesive layer 140 is applied to enhance the bond between the film and the adhesive. The type of primary will vary with the type of film and adhesive used. Examples of suitable primers include chlorinated polyolefins, polyamides and modified polymers such as those disclosed in U.S. Pat. Nos. 6,677,376 and 5,623,010, and other modified acrylic polymers. Typically primers are dispersed into an adequate solvent in very low concentrations (such as less than about 5% solids) and coated onto the film, and dried at room temperature or an elevated temperature to form a very thin layer. Typical solvents may include water, heptane, toluene, acetone, ethyl acetate, isopropanol and the like, used alone or as blends thereof.

Layer 130 is a retroreflective layer. In one instance, layer 130 is adjacent to adhesive layer 140. Layer 130 comprises glass microspheres in a resin (also referred to as a binder). Examples of suitable resin materials include polyvinyl butyral, aliphatic polyurethane and polyurethane extended polyethylene terephthalate (PET) polymers (e.g., described at column 15, lines 30-35 of U.S. Pat. No. 5,882,771, incorporated herein by reference). The microspheres may be glass and approximately 60 microns in diameter, but could range in size from 40 to 90 microns. Microspheres are disposed substantially as a monolayer within the resin. The resin creates a spacing layer around (on all sides of) the microspheres.

When layer 130 is coated with metalized coating 120, light passing through transparent film layer 150, transparent adhesive layer 140 and retroreflective layer 130 is then reflected by metalized coating layer 120 back through each of the three preceding layers. In order to achieve optimum retroreflection (light rays striking a surface and being directed back to the source of light) the binder in layer 130 achieves good cupping around the microspheres to form a spacing layer between the microspheres and the metalized coating. Good cupping occurs when a higher proportion of the metalized coating is positioned at a curved plane where light rays that pass through an individual microsphere are focused. Good cupping is generally achieved by greater penetration of the spacing layer between adjacent microspheres and also by the use of polymeric materials or solutions of appropriate viscosity or flow characteristics. Good cupping is indicated by measurements of microroughness on the back of the retroreflective layer 130 or on the back of the metalized coating layer 120. Generally, good cupping has a microroughness reading of about 125 microinches, on average, or more when measured on a Bendix portable Profilometer using a 2.5-micrometer-radius diamond stylus. The desired microroughness varies somewhat with the size of the microspheres and can be 5 or 10 percent higher for larger microspheres.

Metalized coating layer 120 can be coated onto retroreflective layer 130 using any suitable method, such as physical vapor deposition (PVD) (a.k.a. "vapor coating"). Metalized coating layer 120 may be made of any suitable materials, such as aluminum, tin, or silver.

Layer 110 is a removable adhesive layer such that the film 100 can be removed from object 101 without leaving adhesive residue, and without the use of any chemical removal aids. Adhesive layer 110 may be any type of pressure sensitive adhesive with a suitable peel force. For example, in one instance, adhesive layer 110 may have a peel force of less than 2 lbs/inch or less, or preferably, less than 1.5 lbs/inch or less. An example of a suitable pressure sensitive adhesive is 3M™ Removable Repositionable Adhesive 1000, as used in 3M™ Repositionable Tape 9449S, among others.

In some instances layer 110 may comprise channels that define exit pathways to provide a fluid egress to a periphery of the film when the film is applied to a three-dimensional object. In some instances, layer 110 may alternately or additionally comprise posts in the adhesive to allow slideability. Such adhesive features are described in further detail, for example in U.S. Pat. Nos. 6,197,397 and 5,897,930, incorporated herein by reference.

While layers 110, 120, 130, 140 and 150 are shown as directly adjacent to each other in FIG. 1, intervening layers may also be within the scope of the present disclosure and will be apparent to one of skill in the art upon reading the present disclosure. For purposes of illustration, in some instances primers may be used in conjunction with adhesive layers, multiple adhesive layers may be used in the place of a single adhesive layer, and multiple layers of metalized coating may be used in the place of a single layer of a metalized coating.

The total thickness of film 100, including layers 110, 120, 130, 140 and 150 may range depending on the particular materials chosen for each film layer. In one instance, film 100 may have a thickness in the range of 2 mils to 10 mils. In another instance, film 100 may have a thickness in the range of 5 mils to 8 mils.

Figure 2:
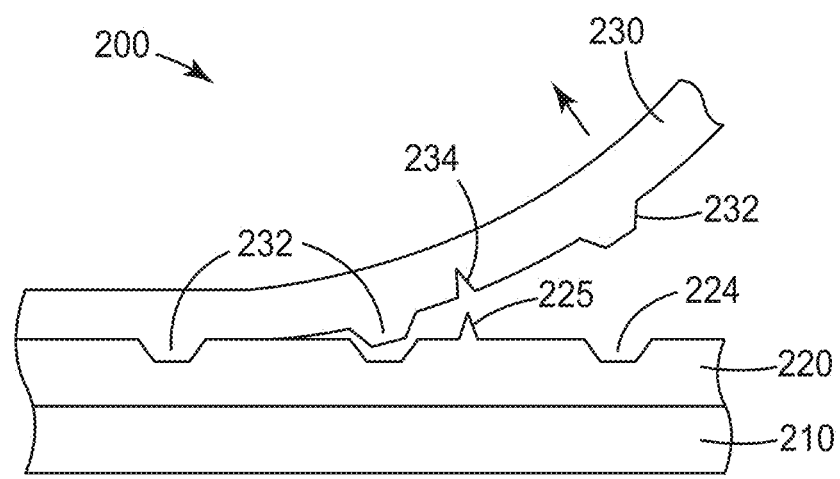
FIG. 2 is an exemplary portion of a cross section of a retroreflective film with structured adhesive features and a liner.

FIG. 2 is an exemplary portion of a cross section of a retroreflective film 200 with structured adhesive features and a removable release liner 230. Retroflective film 210 includes multiple layers, such as layers 120, 130, 140 and 150 as shown in FIG. 1. Adhesive layer 220 is a removable adhesive, similar to adhesive layer 110 in FIG. 1. Adhesive layer 220 includes structures such as channels 224 and posts 225. Channels 224 and posts 225 can be formed by laminating retroflective film 210 and removable adhesive 220 to structured liner 230 with sufficient force that the structures 232 and 234 displace the adhesive to form complementary structures within adhesive layer 220. In another method of manufacture, adhesive layer 220 may be cast onto structured liner 230. Structured liner 230 and adhesive layer 220 may then be laminated to retroreflective film 210. Other methods for creating structures in adhesive layer 220 are discussed in further detail in U.S. Pat. No. 5,650,215, incorporated herein by reference.

Structured liner 230 may be made of a paper or plasticized material that is typically coated with a release coating, such as a silicone, to allow easy removal of structured liner 230 from retoreflective film 210 and adhesive 220 so that retroreflective film 210 with adhesive 220 can be conveniently applied to a three dimensional object with the benefit of posts 225 to allow positionability and channels 224 to provide air egress during the application process.

FIGS. 3A-3E show an exemplary sequence of images illustrating bruising or damaging and restoration of the retroreflectivity of a film consistent with the present disclosure. As described herein, one of the advantages of the present invention is providing a film that can be restored after bruising (or damaging of the retroreflective properties of the film) occurs during installation of the film onto an object. Bruising can occur quite easily, particularly during application of the film onto a three-dimensional object that requires stretching of the film to conform to the surface of the object.

Figure 3A:
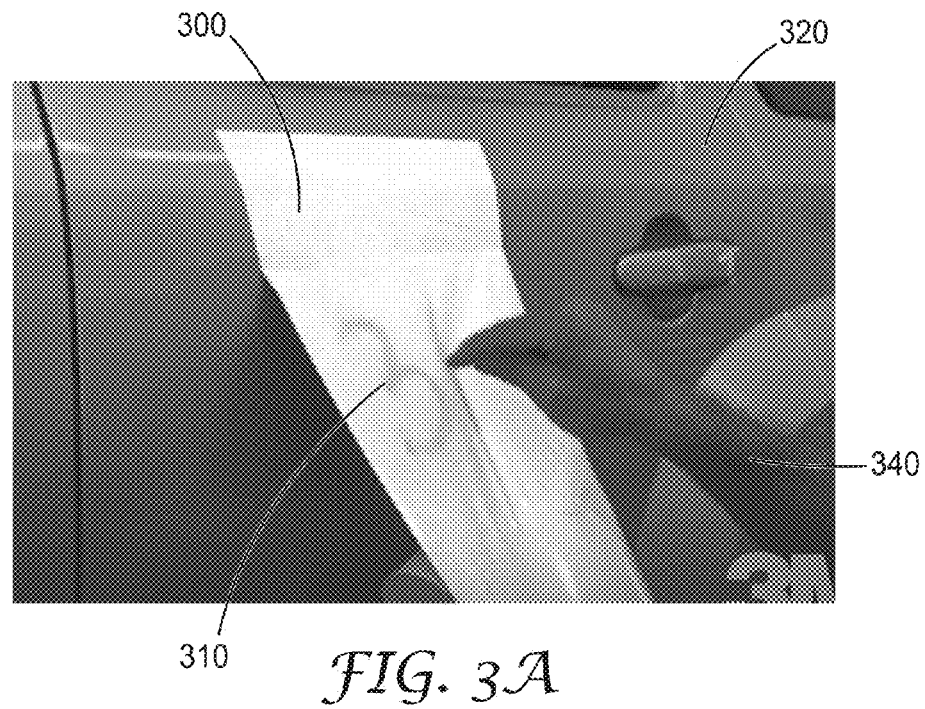
FIGS. 3A-3E show an exemplary sequence of images illustrating bruising or damaging and restoration of the retroreflectivity of a film consistent with the present disclosure.

FIG. 3A shows retroreflective film 300 partially applied to the surface of vehicle 320. A portion of film 300 not applied to vehicle 320 has been bruised by applicator 340 applying directed pressure to the surface of film 300. The darker color of the bruised area 310 is created by the lack of retroreflection in the bruised area 310.

Figure 3B:
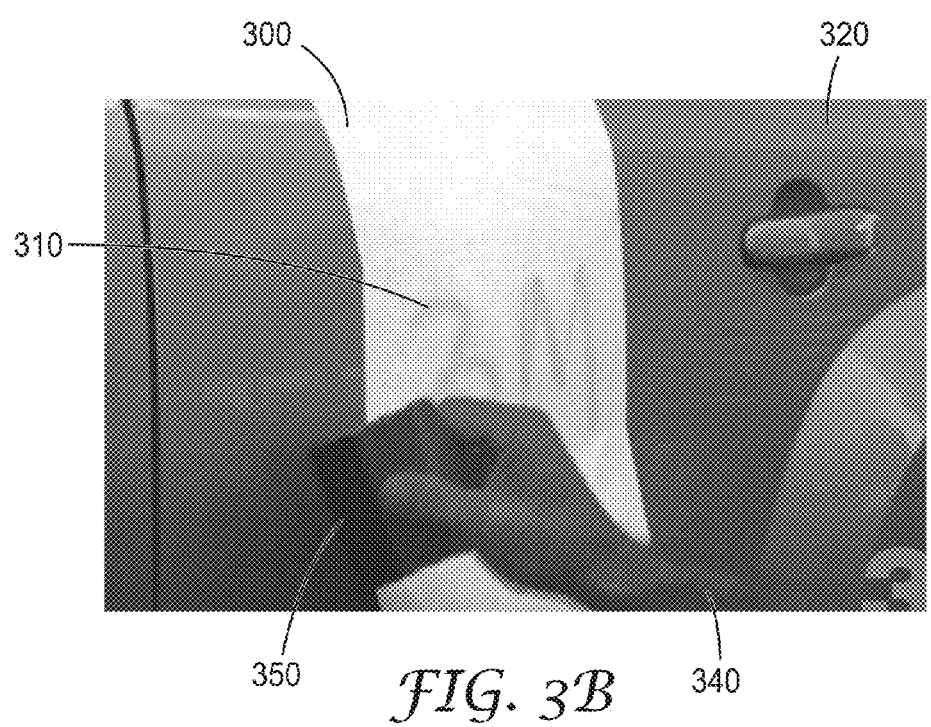

FIG. 3B shows retroreflective film 300 almost entirely applied to vehicle 320. Pressure has been applied by applicator 340 to create a bruised area 310 in the shape of the characters "3M". The applicator 340 is applying pressure to the surface of the film using squeegee 350. This pressure activates the pressure sensitive adhesive on the back side of film 300 to secure the film 300 to the vehicle 320.

Figure 3C:
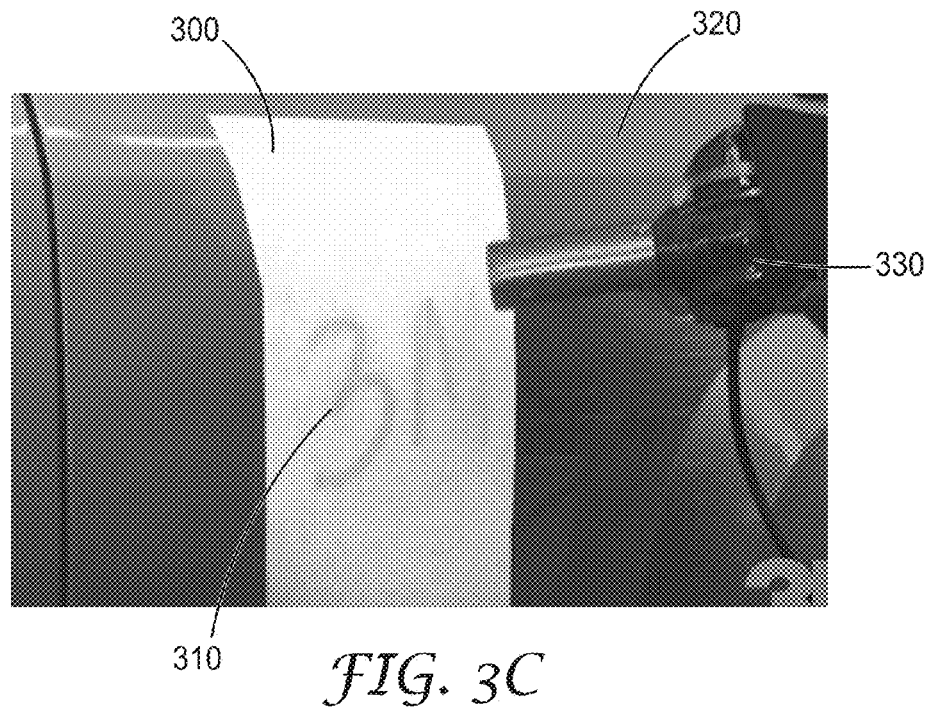
Figure 3D:
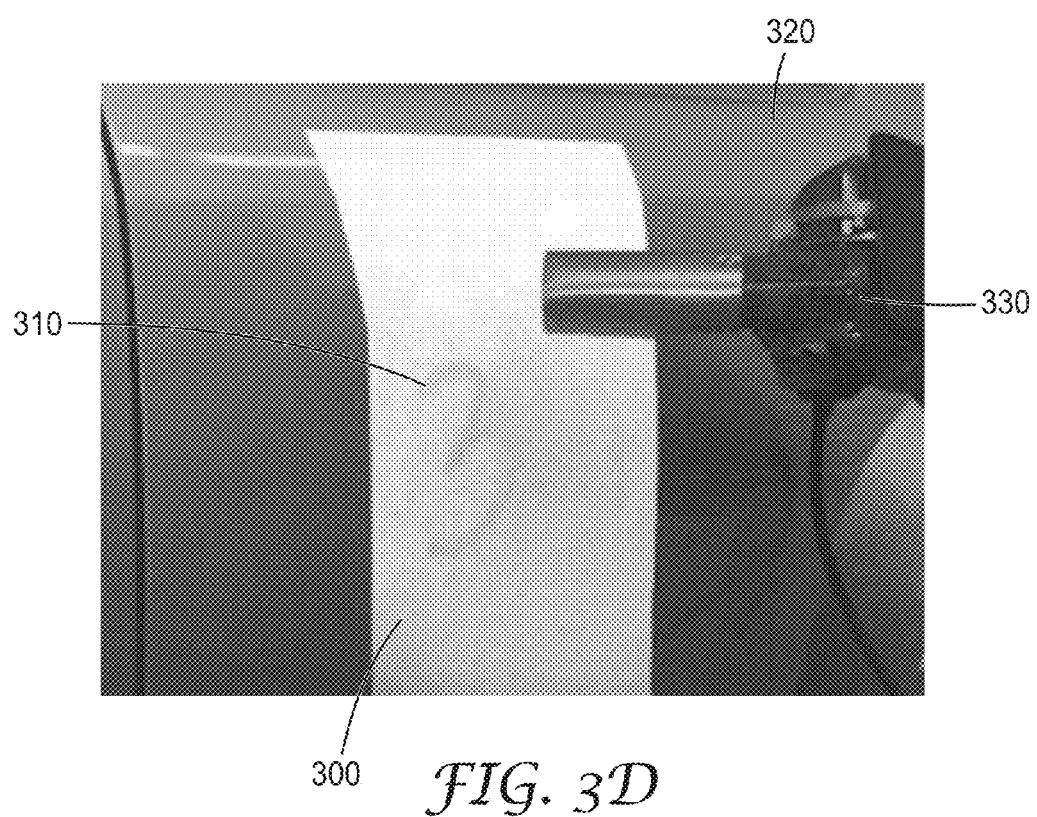
Figure 3E:
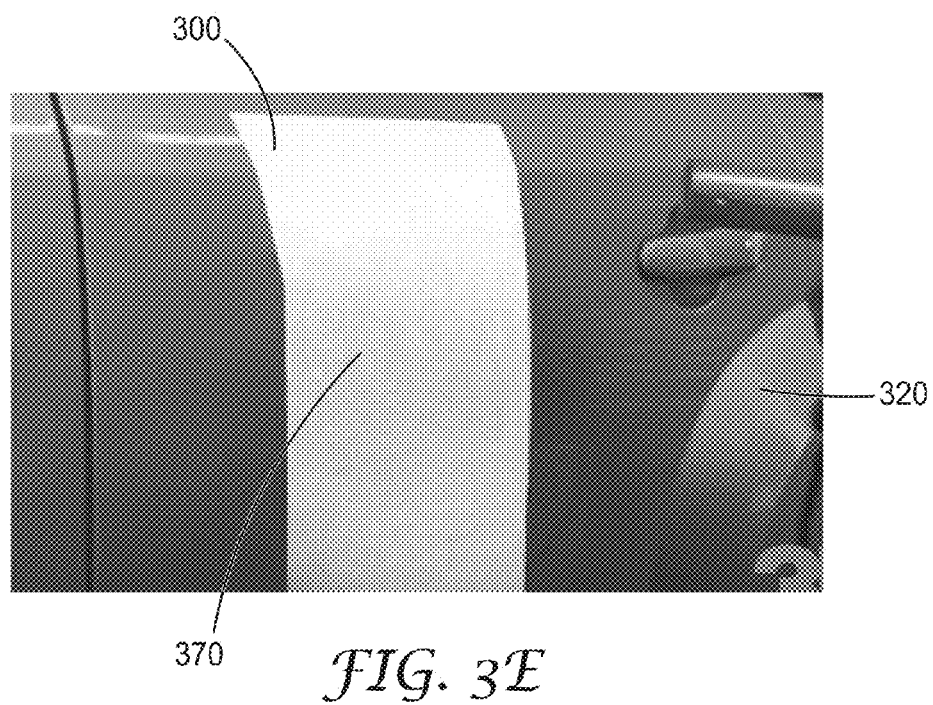

FIG. 3C shows the applicator applying heat to the surface of the film 300 after the film 300 has been applied to vehicle 320 using heat gun 330. In the example shown, heat gun 330 is capable of producing air with a temperature range from 500° F. to 750° F., though heat guns with a broader temperature ranged may be used consistent with the present disclosure. Heat gun 330 was be positioned approximately 1" to 3" away from the surface of the film 300, while slowly moving the heat gun 330 within a small area for approximately 10 to 20 seconds, or until the bruised area 310 had visually recovered FIG. 3C shows that the right-hand side of the bruising in the shape of the "M" is beginning to diminish after application of heat. FIG. 3D shows increased reduction of bruising after further application of heat using heat gun 330. FIG. 3E shows a recovered bruised area 370, after heat has been applied to the film 300. A recovered bruised area may not regain the same level of retroreflectivity the film provided prior to stretching, bruising or application to a vehicle. However, a recovered bruised area does not appear different to an unaided eye viewing the retroreflective film in the dark environment with a light source reflecting off of the film, the light source and observer both being a distance of approximately ten feet from the film.

EXAMPLES

Retro-reflective graphic films were made and tested for gloss and retro-reflective properties before and after heat stretching. Adhesion was also tested. These examples are merely for illustrative purposes only and are not meant to be limiting on the scope of the appended claims.

Test Methods:
Coefficient of Retro-reflection Test

A RoadVista Model 932 Field Retroreflectometer (manufactured by RoadVista, San Diego, Calif.) was used in accordance with ASTM Test Method E1709-09, Standard Test Method for Measurement of Retroreflective Signs Using a Portable Retroreflectometer at a 0.2 Degree Observation Angle, to measure the Coefficient of Retro-reflection of the film samples. The film samples (2 inches wide by 2.75 inches long, after being applied to aluminum panels which are available from Q-Lab Corp. Westlake, Ohio available as Q-PANEL number ED-2.75×11NH, using 5052H38 Bare Aluminum, 0.025"×2.75"×11", Etch & Desmut panels) were measured at the 0.2° observation angle and −4° entrance angle, averaging 4 readings per sample. Percent (%) Retention for the Coefficient of Retro-reflection was calculated by dividing the average value of the Coefficient of Retro-reflection (measured in candlepower/foot-candle/square foot) from a 50% stretch sample by the average value of the Coefficient of Retro-reflection from an unstretched sample of the same film.

Gloss Test

A micro-TRI-gloss 4446 (available from BYK-Gardner USA) was used according to ASTM Test Method D523-14, Standard Test Method for Specular Gloss, to measure 20° and 60° Gloss Values. The same test panels that were used for measuring the Coefficient of Retro-reflection were used for gloss measurements. Measurements were made at 20° and 60° with the instrument oriented so its long dimension was running parallel with the machine direction of the film on the test panel (3 measurements per sample) (referred to as "Machine Direction"). Measurements were also made at 20° and 60° with the instrument oriented so its long dimension was running parallel with the cross direction of the film on the test panel (3 measurements per sample) (referred to as "Cross Direction"). Percent (%) Retention for the 20° and 60° Gloss values was calculated by dividing the average Gloss value (recorded as percent of light returned to the detector) from the 50% stretch sample by the average value from an unstretched sample of the same film.

90° Peel Adhesion Test

An INSTRON model 5564 extensometer (available from INSTRON, Norwood, Mass.) was used in accordance with ASTM Test Method D6862-11, Standard Test Method for 90 Degree Peel Resistance of Adhesives. A 1-inch wide sample of the unprinted test film was applied to an aluminum panel (available from Q-Lab Corp. Westlake, Ohio as Q-PANEL number ED-2.75×11NH, using 5052H38 Bare Aluminum, 0.025"×2.75"×11", Etch & Desmut panels). Then the applied sample was conditioned for 24 hrs (±2 hrs.) at 73.4° F. (±2° F.) with relative humidity of 50% (±2%). The film sample was peeled off the panel, using a peel speed of 12 inches/min, and a 90° peel angle. Results from 3 tests were averaged for each sample. Results were recorded in lb/in.

Example Preparation:

The following film samples were prepared for evaluation:

| Example | Description |
|---|---|
| E1 | Retro-reflective film samples were prepared by the following process: The retro-reflective base material film (element 18 in FIG. 1) of U.S. Pat. No. 4,664,966 Example 1 (incorporated herein by reference), was coated, on the aluminum vapor coated side of the retro-reflective base film, with a very thin layer of a solvent-based adhesion promoter (available from 3M Company St. Paul MN as 3M Tape Primer 94). After the solvent dried, the thickness of the coating was very thin, similar to a vapor coating thickness. Next, |

| Example | Description |
|---|---|
| | two layers of transfer adhesive (available from 3M Company St. Paul MN as 3M Repositionable Tape 9449S), were laminated to the retro-reflective base film, laminating the transfer adhesive against the side that was coated with the adhesion promoter. Next, the above sample was laminated onto a micro-structured, silicone coated release liner. The adhesive side of the film sample pressing against the silicone side of the release liner (available from 3M Company St. Paul MN, as the release liner used on 3M Print Wrap Film IJ180mC-10). Finally, the above sample was laminated (on the retro-reflective film side) with a clear polyvinylchloride film with a pressure sensitive adhesive (available from 3M Company St. Paul MN as 3M SCOTCHCAL Luster Overlaminate 8519). To ensure proper bonding between the film and adhesive layers, this completed sample construction was then baked at 150° F. (±5° F.) for 30 minutes (±5 minutes), prior to use in any testing. |
| CE1 | Retro-reflective film available from 3M Company, St. Paul MN as 3M SCOTCHLITE Reflective Graphic Film 680-10 White |

Unstretched

Samples of these films (2 inches wide by 2.75 inches long) were applied to aluminum panels (available from Q-Lab Corp. Westlake, Ohio as Q-PANEL number ED-2.75×11NH, using 5052H38 Bare Aluminum, 0.025"×2.75"×11", Etch & Desmut panels) and tested using the methods described above. Results are reported in Table 1.

Stretched

Figure 4:
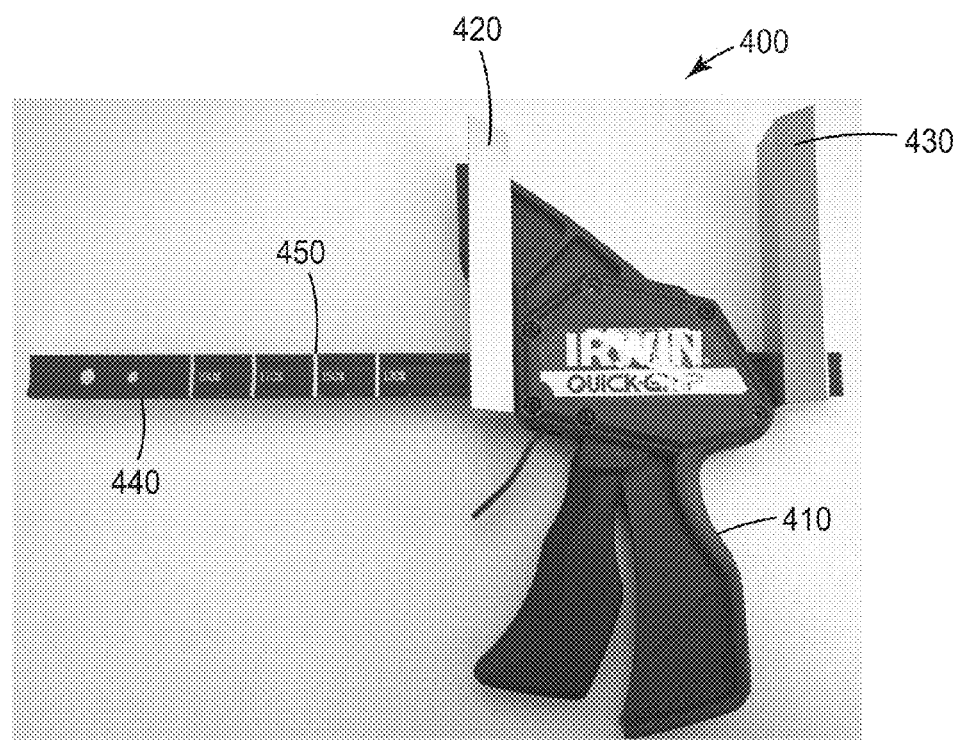
FIG. 4 shows an Irwin QUICK-GRIP SL300 one-handed bar clamp/spreader modified for use as a spreader for use in testing exemplary samples.

An Irwin QUICK-GRIP SL300 One-handed bar clamp/spreader (available from Irwin Tools Huntersville, N.C.) and shown in FIG. 4 was modified for use as a spreader, with an aluminum block 430 attached to the clamp I-beam 440 and another aluminum block 420 attached to the movable handle 410 to allow mounting of a film sample. A 2"×7.5" sample of the adhesive coated test film with the release liner removed was applied across the top edges of the aluminum blocks. The sample was centered across the open area (5.25" wide). The ends of the strip that extend beyond the aluminum blocks were applied to the sides of the aluminum blocks, so the sample was held securely on the aluminum blocks. The spreader with the film attached was placed in a batch oven, set at 150° F. (±5° F.), for 60 seconds (±5 seconds). Within 5 seconds from removal from the oven, the spreader's handle was squeezed at a rate of about one second per squeeze. The handle was repeatedly squeezed until the aluminum blocks were 7.875" apart (or at the 150% mark 450). This point representing a 50% stretch relative to the initial starting point of 5.25". While the stretched film sample was still attached to the spreader, an aluminum panel (available from Q-Lab Corp. Westlake, Ohio as Q-PANEL number ED-2.75×11NH, using 5052H38 Bare Aluminum, 0.025"×2.75"×11", Etch & Desmut panels) was positioned under the sample, in the center of the stretched area. Then the stretched film sample was applied to the test panel, making sure it was applied without any air bubbles under the film. The samples were tested using the methods described above. Results are reported in Table 1.

Test Results:

TABLE 1

Percent Retention of Retro-reflection, Percent Retention of Gloss, and Adhesion Results

| Example | % Retention for Coefficient of Retro-reflection | % Retention for 20° Gloss (Machine Direction) | % Retention for 20° Gloss (Cross Direction) | % Retention for 60° Gloss (Machine Direction) | % Retention for 60° Gloss (Cross Direction) | Average 90° Peel Adhesion from E&D Aluminum (lb/in) |
|---|---|---|---|---|---|---|
| E1 | 51% | 80% | 82% | 99% | 85% | 0.8 |
| CE1 | 10% | 42% | 38% | 82% | 59% | 3.7 |

What is claimed is:

1. A retroreflective film for removable application to a three-dimensional object comprising:
    a transparent film layer;
    a first transparent adhesive layer;
    a retroreflective film comprising glass microspheres and a binder;
    a metalized coating layer comprising aluminum applied on the retroreflective layer;
    a removable adhesive layer having a peel force of 2 lbs/inch or less;
    wherein when the film is elongated by 50% it retains at least 40% of its unstretched coefficient of retroreflection as measured at the 0.2 degree observation angle and −4 degree entrance angle.

2. The film of claim 1, wherein the removable adhesive has a peel force of 1.5 lb/inch or less.

3. The film of claim 1, wherein the removable adhesive layer comprises channels that define exit pathways to provide a fluid egress to a periphery of the film when the film is applied to a three-dimensional object.

4. The film of claim 1, wherein the removable adhesive layer comprises posts in the adhesive to allow slideability.

5. The film of claim 1, further comprising a graphic printed onto the transparent film layer.

6. The film of claim 1, wherein the film has a total thickness in the range of 5 to 8 mils.

7. The film of claim 1, wherein the removable adhesive layer is a pressure sensitive adhesive.

8. The film of claim 1, further comprising a structured removable liner adjacent to the removable adhesive layer.

9. The film of claim 1, wherein when the film is elongated by 50% it retains at least 50% of its gloss when unstretched as measured at a 20 degree angle and in the machine direction.

* * * * *